(12) United States Patent
Liu et al.

(10) Patent No.: US 12,223,579 B2
(45) Date of Patent: Feb. 11, 2025

(54) METHOD AND SYSTEM FOR GENERATING A 3D IMAGE OF A BODY SHAPE

(71) Applicant: City University of Hong Kong, Kowloon (HK)

(72) Inventors: Hongyu Liu, Tai Po (HK); Wing Cheong Daniel Ho, Kowloon (HK)

(73) Assignee: City University of Hong Kong, Kowloon (HK)

( * ) Notice: Subject to any disclaimer, the term of this patent is extended or adjusted under 35 U.S.C. 154(b) by 141 days.

(21) Appl. No.: 17/736,382

(22) Filed: May 4, 2022

(65) Prior Publication Data

US 2023/0360303 A1    Nov. 9, 2023

(51) Int. Cl.
*G06T 15/00* (2011.01)
*G06T 7/60* (2017.01)

(52) U.S. Cl.
CPC .............. *G06T 15/00* (2013.01); *G06T 7/60* (2013.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,253,619 B2 * | 8/2012 | Holbrook | G01S 13/887 324/637 |
| 10,529,137 B1 * | 1/2020 | Black | G06T 15/04 |
| 10,679,046 B1 * | 6/2020 | Black | G06V 40/23 |

(Continued)

FOREIGN PATENT DOCUMENTS

| | | |
|---|---|---|
| EP | 2880633 | 10/2020 |
| JP | 2020000887 | 1/2020 |
| WO | 2020084710 | 4/2020 |

OTHER PUBLICATIONS

Andreas Kirsch and Frank Hettlich; "The Mathematical Theory of Maxwell's Equations;" Department of Mathematics, Karlsruhe Institute of Technology (KIT); Karlsruhe, Germany; 297 pages (Year: 2014).*

(Continued)

*Primary Examiner* — Edward Martello
(74) *Attorney, Agent, or Firm* — Renner, Kenner, Greive, Bobak, Taylor & Weber

(57) ABSTRACT

A method for generating a 3D image of a body shape includes obtaining a set of far-field patterns of electromagnetic waves from a given body shape of a human or animal, establishing a one-to-one correspondence between the body shape and the set of far-field patterns of electromagnetic waves, representing the far-field patterns as a shape generating vector, mapping a vector of characteristic parameters to the shape generating vector, producing a body generation model by taking the vector of characteristic parameters and the shape generating vector as input and output data to form a training dataset for machine learning, specifying a characteristic vector of an unknown geometric body shape and obtaining a shape generating vector of the unknown geometric body shape based on the body generation model, and reconstructing the unknown geometric body shape based on the shape generating vector.

11 Claims, 3 Drawing Sheets

(56) References Cited

U.S. PATENT DOCUMENTS

| | | | | |
|---|---|---|---|---|
| 2006/0066469 | A1* | 3/2006 | Foote | G06T 19/00 342/179 |
| 2019/0196004 | A1* | 6/2019 | Zhao | G01S 13/887 |
| 2019/0333267 | A1* | 10/2019 | Black | G06F 18/2321 |
| 2019/0371080 | A1* | 12/2019 | Sminchisescu | G06T 17/20 |
| 2024/0078721 | A1* | 3/2024 | Al-Saffar | A61B 5/015 |

OTHER PUBLICATIONS

Nguyen et al.; "Generating Point Cloud from Measurements and Shapes Based on Convolutional Neural Network: An Application for Building 3D Human Model;" Computational Intelligence and Neuroscience; vol. 2019, Article ID 1353601, 15 pages https://doi.org/10.1155/2019/1353601 (Year: 2019).*

Alvarez et al., "3D Whole Body Imaging for Detecting Explosive-Related Threats;" IEEE Transactions on Antennas and Propagation, vol. 60, No. 9, pp. 4453-4458; Sep. 2012 (Year: 2012).*

Liu, B., Liu, X., Yang, Z. and Wang, C.C.L., Concise and effective network for 3d human modeling from orthogonal silhouettes (2019). arXiv preprint arXiv: 1912.11616; 13 pages (Year: 2019).*

Li et al.; "4D Human Body Correspondences from Panoramic Depth Maps;" arXiv preprint arXiv:1810.05340v1; 10 pages (Year: 2018).*

Jinghong Li, Hongyu Liu, Wing-Yan Tsui, Xianchao Wang. An inverse scattering approach for geometric body generation: a machine learning perspective[J]. Mathematics in Engineering, 2019, 1(4): 800-823. doi: 10.3934/mine.2019.4.800.

Youzi He, Bin Li, Tingting Sheng, Xianchao Wang. Generating geometric body shapes with electromagnetic source scattering techniques[J]. Electronic Research Archive, 2020, 28(2): 1107-1121. doi: 10.3934/era.2020061.

* cited by examiner

| Color | Frequency (THz) |
|---|---|
| violet | 670-790 |
| blue | 620-670 |
| cyan | 600-620 |
| green | 530-600 |
| yellow | 510-530 |
| orange | 480-510 |
| red | 400-480 |

METHOD AND SYSTEM FOR GENERATING A 3D IMAGE OF A BODY SHAPE

TECHNICAL FIELD

The present invention relates to methods and systems for generating a 3D image of a body shape. In particular, the present invention provides methods and systems for generating a 3D image of a body shape using a body generation model.

BACKGROUND

Technologies for generating a 3D image of a human body shape have various applications in different industries including online shopping, film making, game design, etc. For example, in online shopping business, i.e., for garments or jewelries, customers would like to generate his/her body shape for online fitting before purchase. In artificial intelligences (AIs) for criminal detection, computers can help to generate a body shape of a suspect based on the physical characteristics provided by a witness. In film/movie industry, using virtual actors is getting popular.

There are existing techniques for producing the 3D image of the human body shape that are mainly based on computer vision and imaging processing. However, there has been a need to provide an improved method for generating the 3D image of the human body shape.

SUMMARY OF THE INVENTION

According to embodiments of the present invention, there is provided a method for generating a 3D image of a body shape using a body generation model produced by combining ideas from inverse electromagnetic scattering theory and machine learning, and following bionic process of human vision. Embodiments of the present invention can generate not only stationary but also moving bodies, and moreover it can generate natural colors of the human body.

According to an aspect of the present invention, there is provided a method for generating a 3D image of a body shape implemented by a processor. The method includes obtaining a set of far-field patterns of electromagnetic waves from a given body shape of a human or animal (step A), establishing a one-to-one correspondence between the body shape and the set of far-field patterns of electromagnetic waves (step B), representing the far-field patterns as a shape generating vector (step C), mapping a vector of characteristic parameters to the shape generating vector (step D), producing a body generation model by taking the vector of characteristic parameters and the shape generating vector as input and output data to form a training dataset for machine learning (step E), specifying a characteristic vector of an unknown geometric body shape and obtaining a shape generating vector of the unknown geometric body shape based on the body generation model (step F), and reconstructing the unknown geometric body shape based on the shape generating vector (step G).

In some embodiments, step A may include obtaining the set of far-field patterns of electromagnetic waves of the body shape by solving a certain electromagnetic scattering problems governed by Maxwell system.

In some embodiments, step B may include establishing the one-to-one correspondence between the body shape and the set of far-field patterns of electromagnetic waves by treating the body shape as a scattering object.

In some embodiments, step B may include representing the far-field patterns through the use of vectorial spherical harmonics.

In some embodiments, step B may be based on Fourier theory, and the shape generating vector may consist of corresponding Fourier coefficients of the far field patterns.

In some embodiments, step B may include establishing the one-to-one correspondence between the body shape and the set of far-field patterns of electromagnetic waves by treating the body shape as a perfect conductor.

In some embodiments, step E may further include training the body generation model using the training dataset by artificial neural networks.

In some embodiments, the artificial neural networks may include a convolution neural network (CNN).

In some embodiments, the body shape may include a stationary or moving body shape.

In some embodiments, if the body shape is the stationary body shape, the Maxwell system may be taken to be time-harmonic with frequencies to be a visible electromagnetic spectrum.

In some embodiments, if the body shape is the moving body shape, the Maxwell system may be taken to be time-dependent with a moving scatterer.

In some embodiments, the set of far-field patterns of electromagnetic waves may include electromagnetic spectral data which encodes a color of a scattering object.

In some embodiments, the characteristic parameters may include gender, height, weight, arm span, waist girth, neck girth, abdomen girth, body mass index (BMI), muscle degree, and/or motion trajectory.

In some embodiments, step F may further include obtaining far-field patterns corresponding to the shape generating vector of the unknown geometric body shape.

In some embodiments, step G may include reconstructing the unknown geometric body shape based on the obtained far-field patterns by an inverse scattering algorithm.

According to another aspect of the present invention, there is provided a processor configured to implement the aforementioned method for generating a 3D image of a body shape.

According to yet another aspect of the invention, there is provided a system for generating a 3D image of a body shape, which includes a processor configured to implement the aforementioned method for generating the 3D image of the body shape, an input unit configured to input characteristic parameters of the body shape, and a display unit configured to present the 3D image of the body shape reconstructed by the processor.

Other features and aspects of the invention will become apparent by consideration of the following detailed description, drawings and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

BRIEF DESCRIPTION OF DRAWINGS

These and other features of the invention will become more apparent from the following description, by way of example only, with reference to the accompanying drawings, in which.

Figure 1:
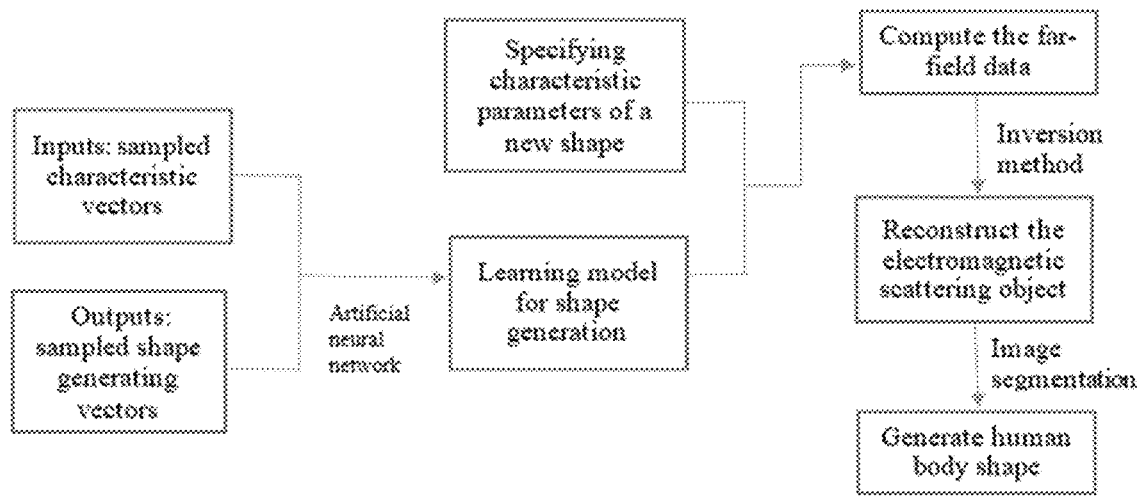
FIG. 1 is a schematic diagram showing a method for generating a 3D image of a body shape using a body generation model according to an embodiment of the present invention.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF PREFERRED EMBODIMENTS

Hereinafter, embodiments of the present disclosure will be described in detail with reference to the drawings.

According to embodiments of the present invention, there is provided a body generation model combining ideas from inverse electromagnetic scattering theory and machine learning, and following bionic process of human vision. Embodiments of the present invention can generate not only stationary but also moving bodies, and moreover it can generate natural colors of the body. The body shape can be of a human or an animal.

In a preferred embodiment of the invention, the process for generating a body shape mimics human vision. The key idea is to identify the shape of a human body with a dataset of visible light that is generated through solving a certain electromagnetic scattering problem. The body generation model in the preferred embodiment maps a vector of characteristic parameters to a corresponding geometric body shape. The body generation model is produced by combining ideas from the aforementioned electromagnetic correspondence and machine learning, and following the bionic process of human vision. The whole process includes the following steps:

By using the theory of direct and inverse electromagnetic scattering, a one-to-one correspondence between a geometric body shape and a set of far-field patterns of electromagnetic waves can be established. From a given body shape, one can obtain the far-field patterns by solving certain electromagnetic scattering problems governed by the Maxwell system by taking the geometric body as a scattering object. From a given dataset of far-field patterns, one can reconstruct the corresponding geometric body shape by inverse scattering schemes. If the body shape is stationary, the Maxwell system is taken to be time-harmonic with frequencies to be the visible electromagnetic spectrum. If the body is in motion, the Maxwell system is taken to be time-dependent with a moving scatterer.

2) By Fourier theory, through the use of vectorial spherical harmonics, the far-field patterns can be further represented as a complex-valued vector, consisting of the corresponding Fourier coefficients of the far-field patterns. Such a vector is referred to as a shape generator.

3) Using tine results obtained in 1) and 2) above, a mapping relationship between vector spaces can be established. In other words, it maps a characteristic vector to a shape generating vector.

4) For a specific application, one can choose a family of sampled human body shapes with well represented characteristic vectors. By following the steps in 1) and 2), one can solve the electromagnetic scattering problems to obtain the corresponding shape generating vectors. Those sampled characteristic vectors and shape generating vectors can serve as input and output data to form a training dataset for the machine learning. Using those training data, training a learning model by proper artificial neural networks can be conducted.

5) For an unknown geometric body shape, by specifying its characteristic vector, the body generation model learned in 4) can be used to firstly obtain a shape generating vector of this unknown shape, and then to obtain corresponding far-field patterns and finally to obtain a body shape by a proper inverse scattering algorithm.

The electromagnetic spectral data encode the color of the scattering object. Hence, the method described above can not only generate desired stationary or moving human body shapes, but can also generate the desired colors of the human body.

FIG. 1 shows, according to one embodiment of the invention, the method for generating the 3D image of the unknown body shape using the body generation model as described with steps 1) to 5) above. That is, the sampled characteristic vectors and the sampled shape generating vectors obtained in steps 1) and 2) can serve as input and output data to form a training dataset for the machine learning. Using those training data, training a learning model by proper artificial neural networks can be conducted. For the unknown body shape, by specifying characteristic parameters of the unknown body shape, a shape generating vector of this unknown body shape is obtained based on the body generation model trained by the artificial neural networks. Corresponding far-field data is computed and then the electromagnetic scattering object (corresponding to the unknown body shape) is reconstructed by a proper inverse scattering algorithm. Finally, the unknown body shape is generated by image segmentation. Detailed description regarding the above process is provided hereinafter.

1. One-to-One Correspondence

The one-to-one correspondence between a human body shape and a far-field vector is established.

First, we let D be a bounded domain in $\mathbb{R}^3$ with a connected complement $\mathbb{R}^3/\overline{D}$, which represents the shape of a human body.

There are two ways to establish the one-to-one correspondence between the geometric shape D and a certain electromagnetic far-field dataset. The first one is to treat D as the support of a source of the form:

$$J(x) = p \cdot f(x) \cdot \chi_D(x), x \in \mathbb{R}^3, \quad (1.1)$$

where $P \in \mathbb{R}^3$ denotes a polarization vector, and $f(x)$ signifies the intensity of the source and $\chi_D$ is the characteristic function of the domain D, namely $\chi_D(\chi)=1$ for $\chi \in D$ and $\chi_D(\chi)=0$ for $\chi \in \mathbb{R}^3/\overline{D}$. In the physical setup, J is referred to as an electric current and it radiates electromagnetic waves. The process is described by the following Maxwell system:

$$\begin{cases} \nabla \wedge E(x) - i\omega\mu_0 H(x) = 0, & x \in \mathbb{R}^3, \\ \nabla \wedge H(x) + i\omega\mu_0 E(x) = J(x), & x \in \mathbb{R}^3, \\ \lim_{|x|\to\infty} |x|\left(\mu_0^{1/2}H \times \frac{x}{|x|} - \varepsilon_0^{1/2}E\right) = 0, \end{cases} \quad (1.2)$$

where the physical meanings of the parameters are given as follows:

(1) E and H are $\mathbb{C}^3$-valued functions, which signify the electric and magnetic waves respectively;
(2) $i=\sqrt{-1}$ is the imaginary unit;
(3) $\omega \in \mathbb{R}_+$ represent an angular frequency of the electromagnetic waves.
(4) $\varepsilon_0$ and $\mu_0$ are respectively the electric permittivity and magnetic permeability of the homogeneous space.
(5) The last limit is known as the Silver-Müller radiation condition which characterizes the outgoing nature of the radiated electromagnetic waves.

The Maxwell system (1.2) is well-posed and can be solved to generate the so-called far-field pattern:

$$E(x) = \frac{e^{ik|x|}}{|x|} E_\infty(\hat{x}) + O(|x|^{-2}), \quad (1.3)$$

where $$\hat{x} = \frac{x}{|x|} \in \mathbb{S}^2 := \{x \in \mathbb{R}^3; |x|=1\}, k = \omega\sqrt{\varepsilon_0\mu_0}.$$

$E_\infty$ is function defined on the unit sphere $\mathbb{S}^2$, and it corresponds to the observation of the electric wave field at the observation angle $\hat{x}$. Clearly, it also depends on the frequency $\omega$, and we write it as $E_\infty(\hat{x}; \omega)$ to specify such a dependence.

Now, (1.1)-(1.3) readily yield a flowchart of mapping a given a human body shape D to the corresponding far-field dataset as follows:

(1) Specify a polarization vector p and an intensity function $f$ to the electric current in (1.1).
(2) Solve the Maxwell system (1.2) to obtain the far-field pattern $E_\infty(\hat{x}; \omega)$ for $\omega \in I=(\underline{\omega}, \overline{\omega})$, where I signifies a certain frequency band.

Figure 2:
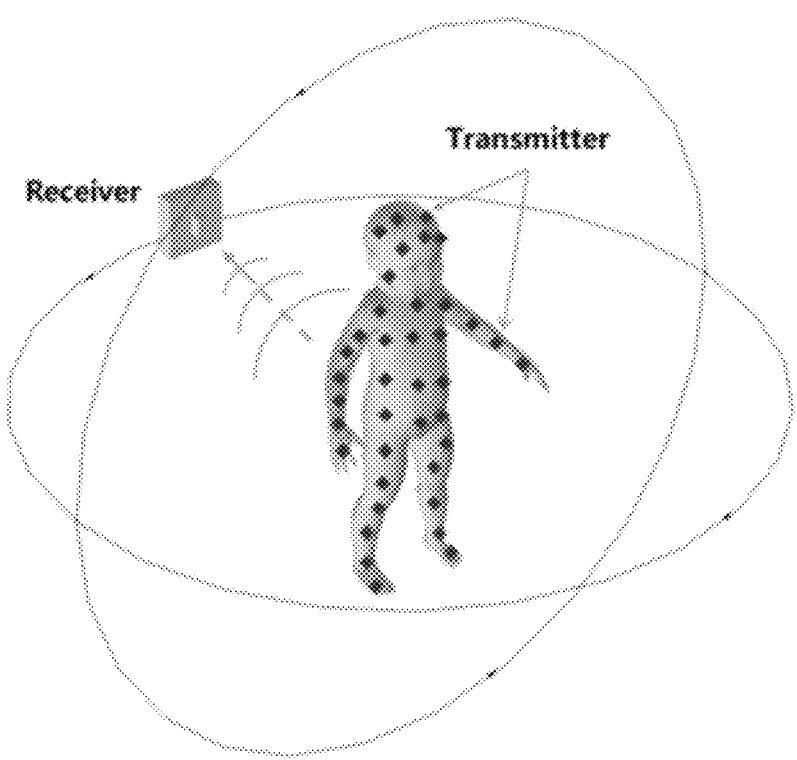
FIG. 2 is a schematic illustration of collecting electromagnetic far-field data for a sample human body shape via physical means according to an embodiment of the present invention.

It is remarked that there are two approaches for realizing the above process: one is physical and the other one is synthetic. For the physical one, one indeed needs make a human body shape (not necessarily a real human body, but can be a model) an active source and then collect (by physical apparatus) the radiated electric far-field pattern $E_\infty(\hat{x}; \omega)$ for $\hat{x} \in \mathbb{S}^2$ and $\omega \in I$. FIG. 2 shows a schematic illustration of such physical means. As shown in FIG. 2, a receiver collects the electromagnetic far-field data for a sample human body shape, by treating the human body as an active source.

The other approach is synthetic which mimics the above physical one by solving the Maxwell system (1.2) numerically (there are many sophisticated numerical methods for solving the Maxwell system, for example by the finite element method) to generate the far-field dataset. In such an approach, one can simply take $p=(\sqrt{2}, 1, 0)^T$, $f=1$ (it is remarked that the choices are infinitely many), and $\varepsilon_0=\mu_0=1$. In summary, we have the following one-way correspondence:

$$D \to E_\infty(\hat{x};\omega), \hat{x} \in \mathbb{S}^2, \omega \in I. \quad (1.4)$$

Let $Y_n^m(\hat{x})$, $n=0, 1, \ldots$ and $m=-n, -n+1, \ldots, n-1, n$, be the spherical harmonics. Define $$V_n^m(\hat{x}) = \frac{1}{\sqrt{n(n+1)}} Grad Y_n^m(\hat{x}), \quad W_n^m(\hat{x}) = \hat{x} \times V_n^m(\hat{x}).$$

One has $$E_\infty(\hat{x}; \omega) = \sum_{n=0}^{\infty} \sum_{m=-n}^{n} a_n^m(\omega) V_n^m(\hat{x}) + b_n^m(\omega) W_n^m(\hat{x}), \quad (1.5)$$

with $$a_n^m(\omega) = \int_{\mathbb{S}^2} E_\infty(\hat{x}; \omega) \cdot V_n^m(\hat{x}) ds(\hat{x}),$$

$$b_n^m(\omega) = \int_{\mathbb{S}^2} E_\infty(\hat{x}; \omega) \cdot W_n^m(\hat{x}) ds(\hat{x}).$$

Let $N, P \in \mathbb{N}$ be properly choosing numbers and $\{\omega_p\}_{p=1}^P$ be a mesh of $I=(\underline{\omega}, \overline{\omega})$. By a cut-off, we can approximately represent $E_\infty(\hat{x}; \omega)$ by the following vector $$\mathscr{F} := (a_n^m(\omega_p), b_n^m(\omega_p))_{n=1,2,\ldots,N; m=-n,\ldots,n; p=1,\ldots,P} \in \mathbb{C}^M, M = N \times (N+2) \times P. \quad (1.6)$$

Finally, let $\zeta=(\zeta_q)_{q=1}^Q \in \mathbb{R}^Q$ denote the characteristic vector of D. By combining (1.4), (1.5) and (1.6), we can establish the following one-way correspondence:

$$\zeta \in \mathbb{R}^Q \to \mathscr{F} \in \mathbb{C}^M, \quad (1.7)$$

where $\zeta$ represents the human body shape and $\mathscr{F}$ represents the vector of the Fourier coefficients of the corresponding far-field dataset.

Next, the reverse correspondence is described, namely, by specifying the far-field dataset to recover the source function J (and hence its support D). We shall adopt the inverse problem technique. To describe the inversion scheme, we first let $$D \subset \left(-\frac{c}{2}, \frac{c}{2}\right)^3,$$

where c is a properly chosen positive number. Define $$k_l := \begin{cases} \frac{2\pi}{c}|l|_\infty, & l \in \mathbb{Z}^3 \setminus \{0\}, \\ \frac{2\pi}{c}\lambda, & l = 0, \end{cases} \quad \hat{x}_l := \begin{cases} \frac{l}{|l|}, & l \in \mathbb{Z}^3 \setminus \{0\}, \\ (1,0,0)^T, & l=0, \end{cases} \quad (1.8)$$

where $\lambda$ is an a-priori chosen sufficiently small positive number. For every $l \in \mathbb{Z}^3 \setminus \{0\}$, we set $$\hat{f}_l = \frac{4\pi\sqrt{\varepsilon_0} \, \hat{x}_l | \times E_\infty(\hat{x}_l, k_l)}{ik_l\sqrt{\mu_0} \, c^3|\hat{x}_l \times p|^2}. \quad (1.9)$$

For l=0, we set $$\hat{f}_0 = \frac{\lambda \pi}{c^3 \sin \lambda \pi} \left( \frac{4\pi \sqrt{\varepsilon_0}\, \hat{x}_0 \times E_\infty(\hat{x}_0, k_0)}{ik_0 \sqrt{\mu_0}\, |\hat{x}_0 \times p|^2} - \sum_{l \in \mathbb{Z}^3 \setminus \{0\}} \hat{f}_l \int_D \exp\left(i\left(k_l \frac{l}{|l|} - k_0 \hat{x}_0\right) \cdot y\right) dy \right). \tag{1.10}$$

Then, we have $$J(x) = p \cdot f(x) \cdot \chi_D(x) = p \sum_{l \in \mathbb{Z}^3} \hat{f}_l \phi_l,$$

where $$\phi_l(x) = \exp\left(i \frac{2\pi}{c} l \cdot x\right), l \in \mathbb{Z}^3, x \in \mathbb{R}^3. \tag{1.11}$$

The other way to establish the above one-to-one correspondence is to treat the human body D as a perfect conductor as follows. Consider the following Maxwell system:

$$\begin{cases} \nabla \wedge E(x) - i\omega\mu_0 H(x) = 0, & x \in \mathbb{R}^3 \setminus \overline{D}, \\ \nabla \wedge H(x) + i\omega\mu_0 E(x) = 0, & x \in \mathbb{R}^3 \setminus \overline{D}, \\ \nu(x) \wedge E(x) = 0, & x \in \partial D, \\ E(x) = E^i(x) + E^s(x), & H(x) = H^i(x) + H^s(x), \\ \lim_{|x| \to \infty} |x| \left( \mu_0^{1/2} H^s \times \frac{x}{|x|} - \varepsilon_0^{1/2} E^s \right) = 0, \end{cases} \tag{1.12}$$

with $$E^i(x) = p e^{ikx \cdot d}, \quad H^i(x) = \frac{1}{i\omega\mu_0} \nabla \wedge E^i(x), x \in \mathbb{R}^3, \tag{1.13}$$

where $p \in \mathbb{R}^3$ and $d \in \mathbb{S}^2$, respectively, denote the polarization vector and incident direction of the plane wave ($E^i$, $H^i$). In (1.12), $\nu$ signifies the exterior unit normal vector to $\partial D$.

Physically, (1.12) describes a physical scenario where one sends a plane wave ($E^i$, $H^i$) to illuminate a perfect conductor D, and generate the electromagnetic wave scattering. Similar to (1.3), $E^s$ also possesses the far-field pattern:

$$E^s(x) = \frac{e^{ik|x|}}{|x|} E_\infty(\hat{x}; p, d, \omega) + O(|x|^{-2}). \tag{1.14}$$

Following a similar spirit, we can establish a one-to-one correspondence as follows:

$$D \leftrightarrow E_\infty(\hat{x}; p, d, \omega), \hat{x} \in \mathbb{S}^2, p \in \mathbb{R}^3, d \in \mathbb{S}^2, \omega \in I. \tag{1.15}$$

Figures 3, 4:
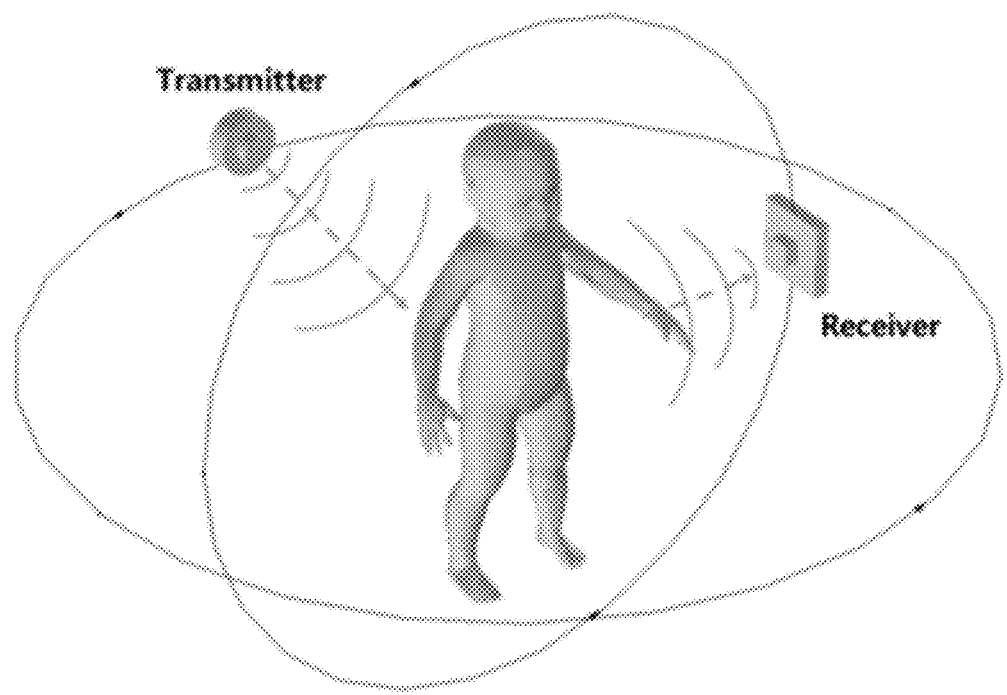
FIG. 3 is a schematic illustration of collecting the electromagnetic far-field data for a sample human body shape via physical means according to another embodiment of the present invention.
FIG. 4 shows a table presenting the correspondence between different colors and different ranges of electromagnetic spectrum.

It is remarked that from D to $E_\infty$, one can achieve this either physically (see FIG. 3 if generated via physical means) or synthetically; whereas from $E_\infty$ to D, one can achieve this by the inverse obstacle scattering technique via a sampling approach. For the physical means, as shown in FIG. 3, a receiver collects the electromagnetic far-field data for a sample human body shape, by treating the human body as a passive PEC (perfectly electric conducting) obstacle.

2. Models for Moving Shapes

Embodiments of the present invention can generate a dynamic body shape as well as a stationary body shape. If the body shape is stationary, the Maxwell system is taken to be time-harmonic with frequencies to be the visible electromagnetic spectrum. If the body is in motion, the Maxwell system is taken to be time-dependent with a moving scatterer.

Let D(x, t), $x \in \mathbb{R}^3$ and $t \in \mathbb{R}_+$ be a human body in motion, where x and t respectively signify the space and time variables. For a simple illustration, it is considered a specific scenario where the body is in a motion of translation only, namely:

$$D_{t'} := \{x + \gamma(t); x \in D\} = \gamma(t) + D, \tag{2.1}$$

where $$\gamma(t): \mathbb{R}_+ \mapsto \mathbb{R}^3, \tag{2.2}$$

signifies the motion trajectory.

Let J(x, t) be a source as follows:

$$J(x,t) = p \cdot f_0 \cdot \chi_{D_t}(x) \cdot \cos(\omega t), x \in \mathbb{R}^3, \tag{2.3}$$

where for simplicity, we let $f_0$ be a constant source intensity.

The dynamic source generates time-dependent electromagnetic wave field, which is described by the following Maxwell system:

$$\begin{cases} \mu_0 \frac{\partial H}{\partial t}(x, t) = -\nabla \wedge E(x, t), & (x, t) \in \mathbb{R}^3 \times \mathbb{R}_+, \\ \varepsilon_0 \frac{\partial E}{\partial t}(x, t) = \nabla \wedge H(x, t) - J(x, t), & (x, t) \in \mathbb{R}^3 \times \mathbb{R}_+. \end{cases} \tag{2.4}$$

Let $B_R$ be a central ball with a sufficiently large radius R>0. Introduce the Cauchy dataset as follows, $$\mathcal{C}(x,t;\omega) := \{\hat{x} \wedge E(x,t;\omega), \hat{x} \wedge H(x,t;\omega)\}, (x,t,\omega) \in \partial B_R \times (0,T) \times I, \hat{x} = x/|x|, \tag{2.5}$$

where T>0 is a time point that can guarantee the radiated wave field can propagate to $\partial B_R$.

By following a similar spirit to our discussion in Section 1, we can establish the following one-to-one correspondence:

$$D_t \leftrightarrow \mathcal{C}(x,t;\omega), (x,t,\omega) \in \partial B_R \times (0,T) \times I. \tag{2.6}$$

Clearly, the above procedure can be easily extended to a general dynamic body shape $D_t$.

In a similar manner, one can treat the dynamic body $D_t$ as a perfect conductor as what we did in (1.12) for a static human body D. In fact, one can consider the following Maxwell system:

$$\begin{cases} \mu_0 \frac{\partial H}{\partial t}(x, t) = -\nabla \wedge E(x, t), & (x, t) \in (\mathbb{R}^3 \setminus \overline{D}_t) \times \mathbb{R}_+, \\ \varepsilon_0 \frac{\partial E}{\partial t}(x, t) = \nabla \wedge H(x, t) - K(x, t), & (x, t) \in (\mathbb{R}^3 \setminus \overline{D}_t) \times \mathbb{R}_+. \\ \nu(x) \wedge E(x, t) = 0 & x \in \partial D_t, \\ \lim_{|x| \to \infty} |x| \left( \mu_0^{1/2} H \times \frac{x}{|x|} - \varepsilon_0^{1/2} E \right) = 0, \end{cases} \tag{2.7}$$

where K(x, t) is an illuminating source and can be chosen to be a collection of point sources:

$$K(x, t) = \sum_{l=1}^{L} p \cdot \delta(x - x_j - \omega t), \tag{2.8}$$

where $\delta$ is the Kronecker delta and $x_j \in \partial B_R$, j=1, ..., L, are equally distributed on $\partial B_R$. Let $\mathcal{C}(x, t; \omega)$ be similarly defined as that in (2.5) associated with (2.7), and one can establish a similar correspondence to (2.6).

As described in Section 1 and Section 2, embodiments of the present invention can generate not only stationary but also moving bodies. Moreover it can generate natural colors of the body as the electromagnetic spectral data encode the color of the scattering object. FIG. 4 shows a table presenting the correspondence between different colors and different ranges of electromagnetic spectrum. The frequency shown in FIG. 4 is represented by $\omega$. Therefore, the embodiments of the invention follow this natural color spectrum correspondence.

3. Convolution Neural Network (CNN)

The body generation model is constructed by taking the vector of characteristic parameters and the shape generating vector as input and output data to form a training dataset for machine learning. Those sampled characteristic vectors and shape generating vectors can serve as input and output data to form the training dataset. Using those training data, a learning model can be trained by proper artificial neural networks. Preferably, the body generation model can be trained by a convolution neural network (CNN).

Figure 5:
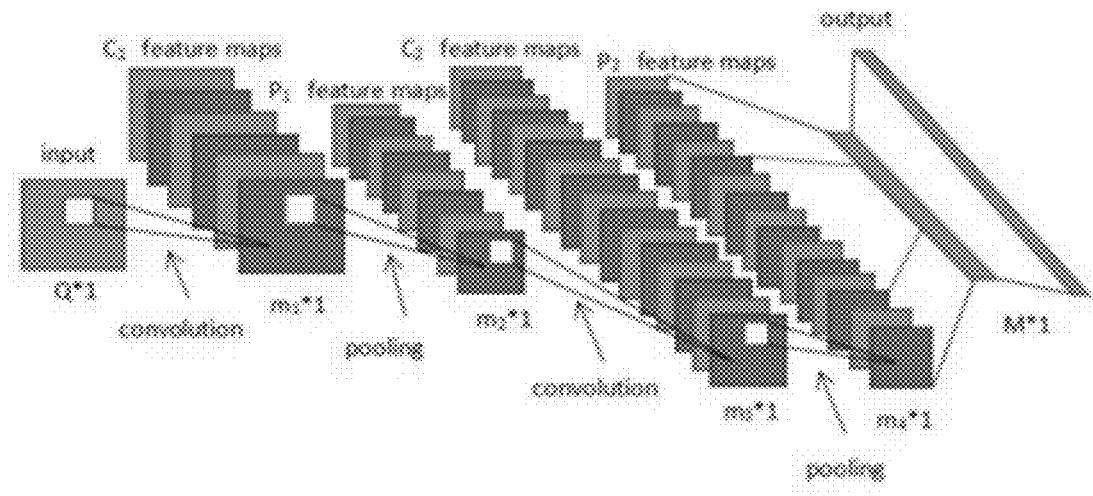
FIG. 5 is a schematic illustration of a Convolution Neural Network (CNN) for training a geometric body generation model according to an embodiment of the present invention.

FIG. 5 shows a schematic illustration of the CNN for training the geometric body generation model. For the CNN network, two convolution layers and two pooling layers can be used for example. The size of convolutional kernel can be 3×1. The size of the input vector is Q×1 and the size of the output vector is M×1. Depending on the specific application, e.g. high resolution or dynamic shape generation, Q and M range from a hundred to a million.

For an illustrative example in the Application Form, the parameters used were given as follows:

(1) We chose 4 characteristic parameters for the human body shape: Weight, Arm Span, Height and Muscle Degree. That means, Q=4.
(2) We chose N=15 and P=10 for $\underline{\omega}=1$ and $\overline{\omega}=6$ in (1.6) in Section 1. That means, M=15×17×10.
(3) For the CNN, we chose 20 sample body shapes for generating the training dataset.

The characteristic parameters may include, but not limited to, gender, height, weight, arm span, waist girth, neck girth, abdomen, girth, body mass index (BMI), muscle degree, and/or motion trajectory.

Figure 6:
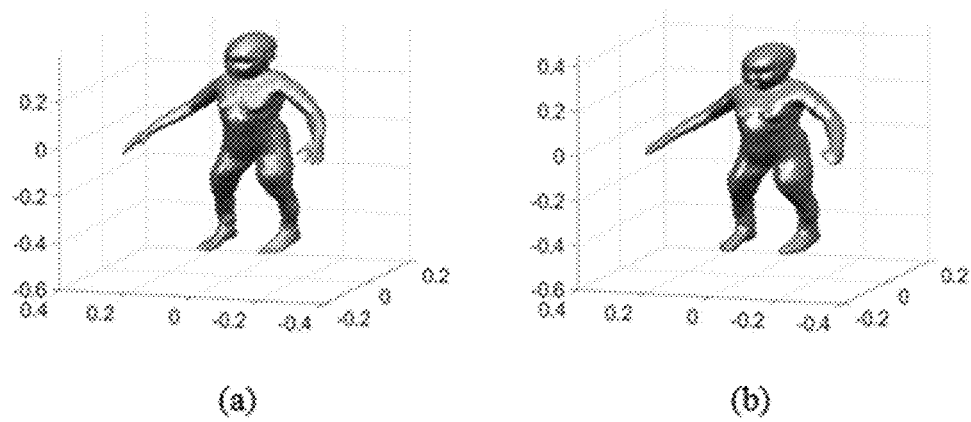
FIG. 6 shows a schematic illustration of an exact body shape (a) and a reconstructed body shape (b) obtained according to an embodiment of the present invention.

FIG. 6(a) shows a schematic illustration of an exact body shape, and FIG. 6(b) shows a schematic illustration of a reconstructed body shape obtained according to the method as described above. The body shape shown in FIG. 6(b) was reconstructed using only three characteristics parameters.

According to an embodiment of the present invention, a computer image of a 3D human body can be generated by inputting corresponding characteristic parameters. This technique can find wide applications in many cutting-edge applications and technologies, such as online fitting in online shopping business, generating a body shape of a suspect in AIs for criminal detection, and generating virtual actors in a movie. The present invention can also be used in health and fitness management, including evaluation of body composition and study of nutritional disorders. Moreover, the present invention can be applied to metaverse, which has considerable potential in computer games, education, retail and real estate.

According to embodiments of the present invention, after pre-processing, a human body shape is actually a certain far-field dataset of electromagnetic waves which can be boiled down to a small-size shape generating vector. This makes it much more economical, not only in time but also in cost, and also easier to implement. It can generate both stationary and dynamic human bodies, even with intrinsic colors of the body, in a bionic manner.

The method for producing the body generation model as described above can be implemented by a processor or a computer using a set of computer codes of algorithms for the body generation model. The processor may be further configured to implement the method for generating a 3D image of a body shape based on the body generation model as described above. A system may be provided including the aforementioned processor, an input unit configured to input characteristic parameters of a body shape, and a display unit configured to present the 3D image of the body shape reconstructed by the processor.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable sub-combination.

The invention claimed is:

1. A method for generating a 3D image of a body shape, implemented by a processor, comprising the steps of:
   A. obtaining a set of far-field patterns of electromagnetic waves from a given body shape of a human or animal by collecting electromagnetic far-field patterns radiated from physical means, the physical means comprising a body shape model;
   B. establishing a one-to-one correspondence between the body shape and the set of far-field patterns of electromagnetic waves;
   C. representing the far-field patterns as a shape generating vector;
   D. mapping a vector of characteristic parameters to the shape generating vector;
   E. producing a body generation model by taking the vector of characteristic parameters and the shape generating vector as input and output data to form a training dataset for machine learning;
   F. specifying a characteristic vector of an unknown geometric body shape and obtaining a shape generating vector of the unknown geometric body shape based on the body generation model;
   G. obtaining far-field patterns corresponding to the shape generating vector of the unknown geometric body shape; and
   H. reconstructing the unknown geometric body shape based on the obtained far-field patterns by an inverse scattering algorithm governed by a Maxwell system,
   wherein the body shape comprises a stationary or moving body shape,
   wherein, if the body shape is the moving body shape, the Maxwell system is taken to be time-dependent with a moving scatterer, and
   wherein the set of far-field patterns of electromagnetic waves comprises electromagnetic spectral data which encodes a color of a scattering object.

2. The method of claim 1, wherein step B comprises establishing the one-to-one correspondence between the body shape and the set of far-field patterns of electromagnetic waves by treating the body shape as a scattering object.

3. The method of claim 1, wherein step B comprises representing the far-field patterns through the use of vectorial spherical harmonics.

4. The method of claim 3, wherein step B is based on Fourier theory, and the shape generating vector consists of corresponding Fourier coefficients of the far field patterns.

5. The method of claim 1, wherein step B comprises establishing the one-to-one correspondence between the body shape and the set of far-field patterns of electromagnetic waves by treating the body shape as a perfect conductor.

6. The method of claim 1, wherein step E further comprises training the body generation model using the training dataset by an artificial neural network.

7. The method of claim 6, wherein the artificial neural network comprises a convolution neural network (CNN).

8. The method of claim 1, wherein if the body shape is the stationary body shape, the Maxwell system is taken to be time-harmonic with frequencies to be a visible electromagnetic spectrum.

9. The method of claim 1, wherein the characteristic parameters comprise gender, height, weight, arm span, waist girth, neck girth, abdomen girth, body mass index (BMI), muscle degree, and/or motion trajectory.

10. A processor configured to implement the method of claim 1.

11. A system for generating a 3D image of a body shape, comprising:
- a processor configured to implement the method of claim 1;
- an input unit configured to input characteristic parameters of a body shape; and
- a display unit configured to present the 3D image of the body shape reconstructed by the processor.

* * * * *